US012638847B2

(12) United States Patent
Patnaik

(10) Patent No.: US 12,638,847 B2
(45) Date of Patent: May 26, 2026

(54) EXTERNAL INDICATION HANDLING FOR AUTONOMOUS DRIVING SYSTEMS

(71) Applicant: Waymo LLC, Mountain View, CA (US)

(72) Inventor: Vijaysai Patnaik, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/520,509

(22) Filed: Nov. 27, 2023

(65) Prior Publication Data

US 2024/0094733 A1     Mar. 21, 2024

Related U.S. Application Data

(63) Continuation of application No. 17/244,911, filed on Apr. 29, 2021, now Pat. No. 11,829,146.

(60) Provisional application No. 63/131,299, filed on Dec. 28, 2020.

(51) Int. Cl.
*G05D 1/02* (2020.01)
*B60W 60/00* (2020.01)
*G05D 1/00* (2006.01)
(52) U.S. Cl.
CPC ......... *G05D 1/0214* (2013.01); *B60W 60/001* (2020.02); *G05D 1/0276* (2013.01); *B60W 2520/04* (2013.01); *B60W 2555/60* (2020.02); *B60W 2710/186* (2013.01)

(58) Field of Classification Search
CPC .. G05D 1/0214; G05D 1/0276; G05D 1/0055; B60W 60/001; B60W 2520/04; B60W 2555/60; B60W 2710/186
See application file for complete search history.

(56) References Cited

U.S. PATENT DOCUMENTS

| | | | | |
|---|---|---|---|---|
| 9,305,407 B1 * | 4/2016 | Walton | ..................... | G08G 1/20 |
| 9,463,794 B1 * | 10/2016 | Silver | ................. | G05D 1/0274 |
| 10,559,139 B2 * | 2/2020 | Seaman | ................. | G06Q 10/08 |
| 10,825,340 B1 | 11/2020 | Floyd | | |
| 2012/0169516 A1 * | 7/2012 | Turnock | ................... | G07C 9/27 |
| | | | | 340/928 |
| 2017/0358147 A1 | 12/2017 | Brinig et al. | | |
| 2018/0154777 A1 | 6/2018 | Hall et al. | | |
| 2018/0321685 A1 | 11/2018 | Yalla et al. | | |
| 2019/0015976 A1 * | 1/2019 | Sweeney | ............... | B25J 9/1602 |

(Continued)

FOREIGN PATENT DOCUMENTS

| | | |
|---|---|---|
| CN | 105270364 A | 1/2016 |
| CN | 106920414 A | 7/2017 |

(Continued)

OTHER PUBLICATIONS

Office Action for Chinese Patent Application No. 202111622071.1, mailed May 13, 2024, 10 Pages.

*Primary Examiner* — Rodney A Butler
(74) *Attorney, Agent, or Firm* — Lowenstein Sandler LLP

(57) ABSTRACT
A method includes detecting, by a sensing system of an autonomous vehicle (AV) executing a trip from a first location to a second location, a signal to stop the AV, determining, in response to the signal, that the AV is to be stopped for a roadside inspection, and causing a vehicle control system of the AV to stop the AV at a third location to allow the roadside inspection to be performed.

20 Claims, 5 Drawing Sheets

(56) References Cited

U.S. PATENT DOCUMENTS

| | | | | |
|---|---|---|---|---|
| 2020/0086837 A1* | 3/2020 | Le Cornec | .......... | B60W 50/029 |
| 2021/0012661 A1* | 1/2021 | Yang | ...................... | G08G 1/167 |
| 2021/0070282 A1 | 3/2021 | Kim | | |
| 2021/0197702 A1* | 7/2021 | Krishnamurthi | ..... | G07C 5/0808 |
| 2021/0201678 A1* | 7/2021 | Baldwin | .............. | G05D 1/0274 |
| 2022/0111837 A1 | 4/2022 | Yeom et al. | | |

FOREIGN PATENT DOCUMENTS

| | | |
|---|---|---|
| CN | 109643120 A | 4/2019 |
| CN | 111348032 A | 6/2020 |
| CN | 111547043 A | 8/2020 |
| CN | 111857118 A | 10/2020 |
| CN | 112073142 A | 12/2020 |
| CN | 112124096 A | 12/2020 |

* cited by examiner

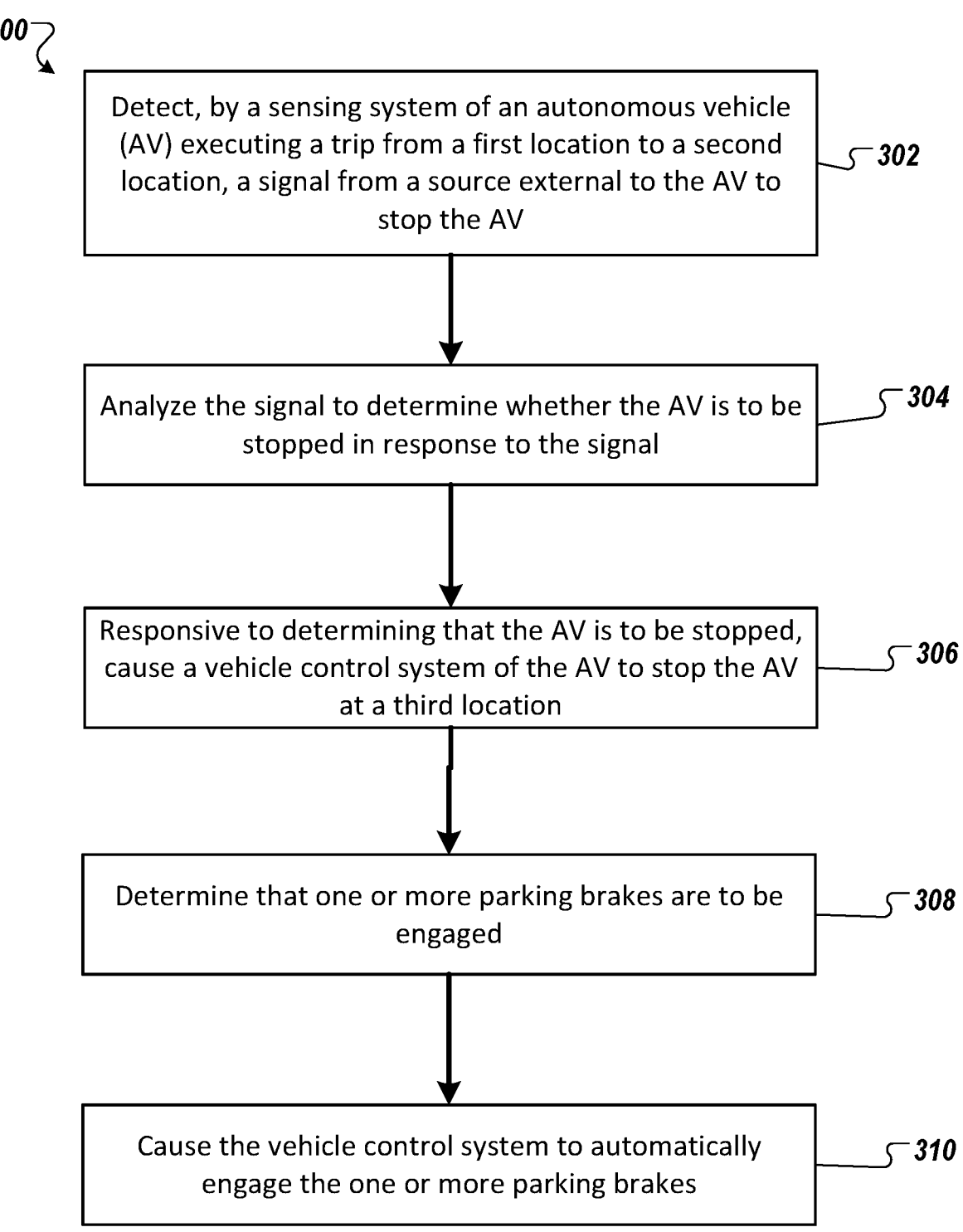

*300*

Detect, by a sensing system of an autonomous vehicle (AV) executing a trip from a first location to a second location, a signal from a source external to the AV to stop the AV — *302*

Analyze the signal to determine whether the AV is to be stopped in response to the signal — *304*

Responsive to determining that the AV is to be stopped, cause a vehicle control system of the AV to stop the AV at a third location — *306*

Determine that one or more parking brakes are to be engaged — *308*

Cause the vehicle control system to automatically engage the one or more parking brakes — *310*

FIG. 3A

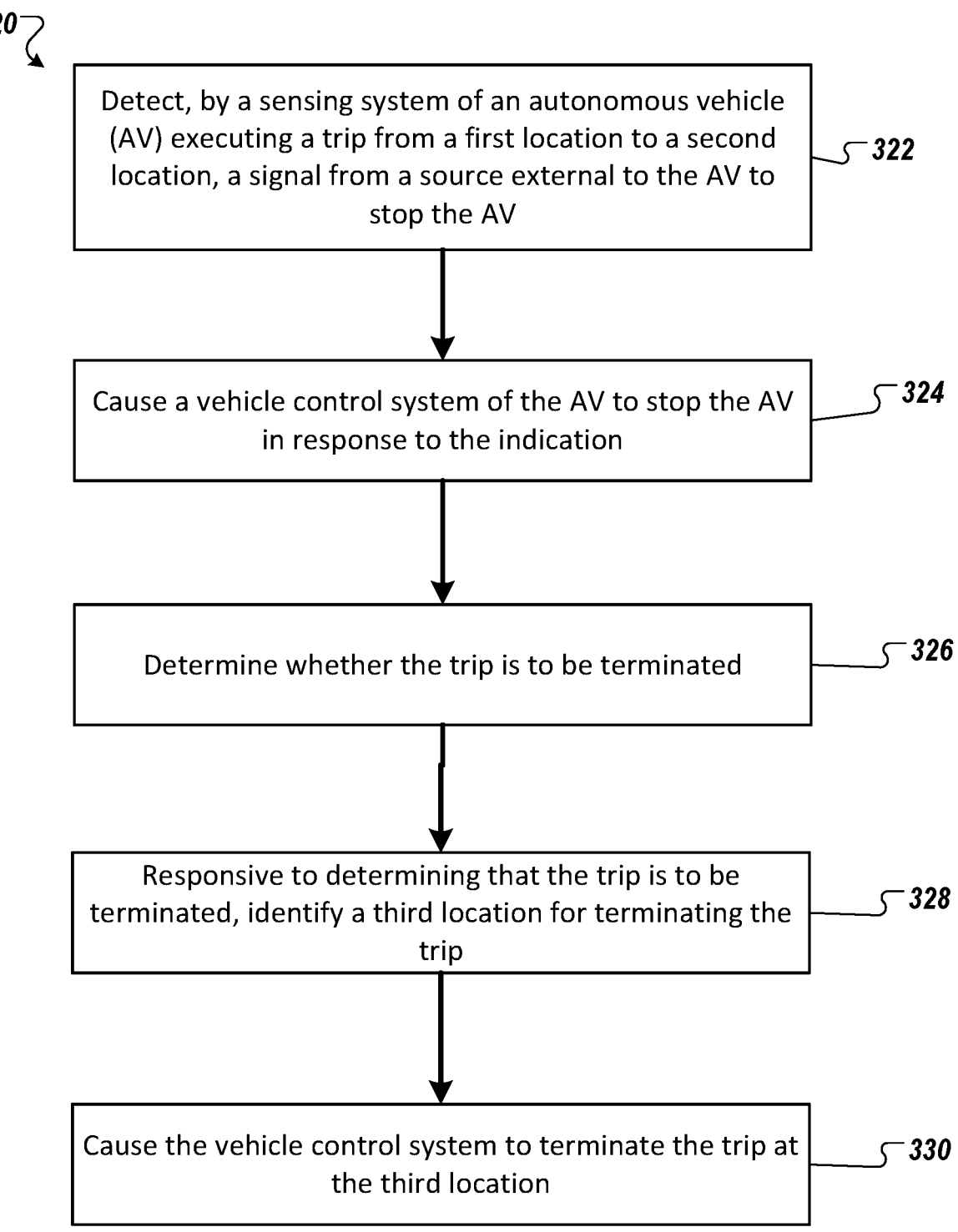

320

Detect, by a sensing system of an autonomous vehicle (AV) executing a trip from a first location to a second location, a signal from a source external to the AV to stop the AV — 322

Cause a vehicle control system of the AV to stop the AV in response to the indication — 324

Determine whether the trip is to be terminated — 326

Responsive to determining that the trip is to be terminated, identify a third location for terminating the trip — 328

Cause the vehicle control system to terminate the trip at the third location — 330

FIG. 3B

EXTERNAL INDICATION HANDLING FOR AUTONOMOUS DRIVING SYSTEMS

RELATED APPLICATIONS

This application is a continuation application of co-pending U.S. patent application Ser. No. 17/244,911, filed Apr. 29, 2021, which claims the benefit of priority from U.S. Provisional Patent Application No. 63/131,299, filed Dec. 28, 2020, each of which is incorporated herein by reference.

TECHNICAL FIELD

The instant specification generally relates to autonomous vehicles. More specifically, the instant specification relates to implementing external indication handling with respect to the autonomous vehicles.

BACKGROUND

An autonomous vehicle (AV) operates by sensing an outside environment with various sensors and charting a driving path through the environment based on the sensed data, Global Positioning System (GPS) data, and road map data. Among the autonomous vehicles are trucks used for long-distance load deliveries. Autonomous trucks have to meet high standards of safety, which can include both the standards common for all vehicles (driver-operated and self-driving alike) as well as additional standards specific for autonomous trucks. Various solutions that improve fuel efficiency, performance, and safety have to be designed without reliance on visual perception, driving experience, and decision-making abilities of a human operator.

BRIEF DESCRIPTION OF THE DRAWINGS

The disclosure is illustrated by way of examples, and not by way of limitation, and can be more fully understood with references to the following detailed description when considered in connection with the figures, in which:

FIG. 3A depicts a flow diagram of an example method of performing external indication handling with respect to the autonomous vehicles to engage one or more parking brakes automatically, in accordance with some implementations of the disclosure.

FIG. 3B depicts a flow diagram of an example method of performing external indication handling with respect to the autonomous vehicles to terminate a trip by the AV, in accordance with some implementations of the disclosure.

SUMMARY

Figure 1:
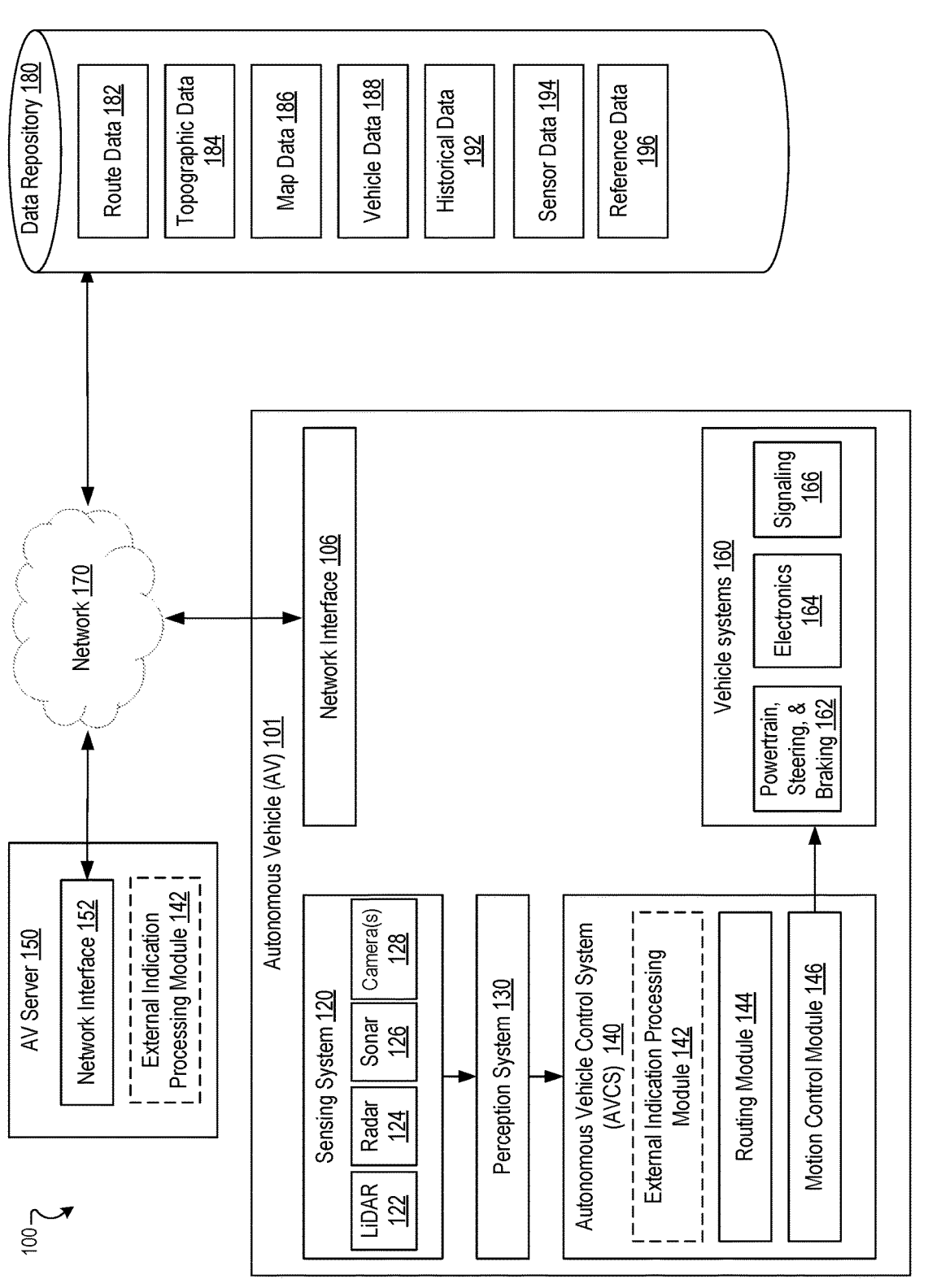
FIG. 1 is a diagram illustrating components of an example architecture of a system that provides external indication handling for an autonomous vehicle (AV), in accordance with some implementations of the disclosure.

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a method comprises detecting, by a sensing system of an autonomous vehicle (AV) executing a trip from a first location to a second location, a signal from a source external to the AV to stop the AV; analyzing, by a processing device, the signal to determine whether the AV is to be stopped in response to the signal; responsive to determining that the AV is to be stopped, causing a vehicle control system of the AV to stop the AV at a third location; determining, by the processing device, that one or more parking brakes are to be engaged; and causing, by the processing device, the vehicle control system to automatically engage the one or more parking brakes.

In some implementations, causing the vehicle control system to stop the AV at the third location comprises responsive to determining that the AV is to be stopped, determining, by the processing device, that a characteristic of the AV satisfies a condition to stop the AV at the third location; and causing the vehicle control system of the AV to stop the AV at the third location.

In some implementations, causing the vehicle control system to stop the AV comprises responsive to determining that the AV is to be stopped, identifying, by the processing device, the third location to stop the AV based on the indication from the source external to the AV; and causing the vehicle control system of the AV to stop the AV at the third location.

In some implementations, analyzing the signal to determine whether the AV is to be stopped comprises analyzing a road signage indicating that the AV is to be stopped at the third location; and determining whether the AV is to be stopped based on the road signage.

In some implementations, the method further comprises determining, by the processing device, whether the trip is to be terminated; responsive to determining that the trip is to be terminated, determining whether the trip is to be terminated at the third location; and responsive to determining that the trip is to be terminated at the third location, causing the vehicle control system to terminate the trip at the third location.

In some implementations, the method further comprises responsive to determining that the trip is not to be terminated at the third location, identifying, by the processing device, a fourth location for terminating the trip; determining, by the processing device, that the one or more parking brakes are to be disengaged; and causing the vehicle control system to automatically disengage the one or more parking brakes; move the AV to the fourth location; and terminate the trip at the fourth location.

In some implementations, the method further comprises responsive to determining that the trip is not to be terminated, determining, by the processing device, that the one or more parking brakes are to be disengaged; and causing the vehicle control system to automatically disengage the one or more parking brakes; and continue executing the trip to the second location.

In another aspect of the present disclosure, a system comprises a memory device; and a processing device, coupled to the memory device, wherein the processing device is to detect, by a sensing system of an autonomous vehicle (AV) executing a trip from a first location to a second location, an indication from a source external to the AV to stop the AV; cause a vehicle control system of the AV to stop the AV in response to the indication; determine whether the trip is to be terminated; responsive to determining that the trip is to be terminated, identify a third location for terminating the trip; and cause the vehicle control system to terminate the trip at the third location.

In some implementations, the processing device is further to: responsive to causing the vehicle control system to stop the AV, determine that one or more parking brakes are to be engaged; and cause the vehicle control system to automatically engage the one or more parking brakes. In some implementations, the processing device is further to determine that the one or more parking brakes are to be disengaged; cause the vehicle control system to automatically disengage the one or more parking brakes; and cause the vehicle control system to move the AV to the third location.

In some implementations, the third location is identified based on the indication from the source external to the AV. In some implementations, to cause the vehicle control system to stop the AV, the processing device is to determine that a characteristic of the AV satisfies a condition to stop the AV at a fourth location; and cause the vehicle control system of the AV to stop the AV at the fourth location. In some implementations, the processing device is further to: analyze the indication to determine whether the AV is to be stopped, wherein the indication comprises a road signage indicating that the AV is to be stopped.

In another aspect of the present disclosure, a non-transitory device-readable medium storing instructions that, when executed by a processing device associated with a computer system, cause the processing device to perform operations comprising detecting, by a sensing system of an autonomous vehicle (AV) executing a trip from a first location to a second location, a signal from a source external to the AV to stop the AV; analyzing the signal to determine whether the AV is to be stopped in response to the signal; responsive to determining that the AV is to be stopped, causing a vehicle control system of the AV to stop the AV at a third location; determining that one or more parking brakes are to be engaged; and causing the vehicle control system to automatically engage the one or more parking brakes.

DETAILED DESCRIPTION

A vehicle (e.g., truck) on a road is subject to various rules and regulation, including roadside law enforcement inspections (also referred to as "roadside inspections"). Roadside inspections herein refers to examinations of vehicles and/or drivers by authorized personnel. The roadside inspections can include vehicle inspections, including but not limited to, suspension, tire, rim, hub, wheel assemblies, open top trailer and van bodies, windshield wiper operations, emergency exit, steering mechanisms, driveline and driveshaft mechanisms, lightning device, coupling operations, cargo securement, hazardous material and cargo tank specification compliance, braking systems, electrical systems, exhaust systems, fuel systems, etc. The roadside inspections can include driver inspections, including but not limited to, driver license, medical examiner's certificate, skill performance evaluation (SPE) certificate, driver's record of duty status (RODS), driver's hours of service (HOS), use of alcohol and drugs, use of seatbelt, etc. An authorized personnel can perform roadside inspections by signaling (e.g., providing an indication to) a driver of a vehicle that is driving on a road to stop the vehicle on the side of the road or go to a location outside of the road the vehicle is driving on, and perform the actions necessary to inspect the vehicle and/or driver while the vehicle is stopped. Road signage, such as, a signpost, an electronic sign, etc. can also indicate to the driver of the vehicle that the vehicle is to be stopped at a designated location for roadside inspections, and an authorized personnel can perform the roadside inspection at the designated location. In some cases, the designated location for the inspection can include a weigh station, which is a checkpoint along a highway generally designated to inspect vehicular weights. For a commercial vehicle, personnel that are authorized to inspect the vehicle can include law enforcement personnel with special credentials, such as, highway patrol officers, officers from a particular government agency, etc.

Conventionally, a human operator (e.g., a driver) of a vehicle can handle external indications from a person providing the indication to stop the vehicle by recognizing that it is an authorized personnel based on visually identifying the person as a law enforcement personnel authorized to inspect the vehicle. The driver can also recognize that the person is an authorized personnel based on visually examining the vehicle of the person. After recognizing that the person providing the indication is an authorized personnel, the driver can make a decision to stop the vehicle at an appropriate location. The driver can recognize the need to stop at a designated location by reading the road signage and assessing whether the signage applies to the vehicle under the circumstances. The driver can pull over to a location the driver deems to be safe, based on driving experience, visual perception etc., on the side of the road, or at the location as directed by the authorized personnel. At the time the authorized personnel performs the inspection, the driver can control the vehicle such that the vehicle does not move during the inspection, as a moving vehicle can cause harm to the inspector and interfere with complying with the road inspection requirements. If the authorized personnel declares the vehicle "out-of-service," for example, for failing to pass requirements of the roadside inspection, the driver may be asked to cancel the current trip for the vehicle and report to a particular location for complying with the rules of the roadside inspections.

Aspects of the disclosure provide technology that allows implementing external indication handling with respect to an autonomous vehicle (AV) without reliance on visual perception, driving experience, and decision-making abilities of a human operator. An AV performs vehicle actions, such as braking, steering, and throttling, to move the AV from the starting location to the destination location along the route. In some implementations, while the AV executes a trip from a first location (e.g., starting location) to a second location (e.g., destination location), a processing device (e.g., hosted by a server or onboard the AV) can detect a signal from a source external to the AV to stop the AV. The signal can be detected by a sensing system of the AV. In an example, the external source can be an individual (e.g., a law enforcement officer) inside another moving or stationary vehicle (e.g., a law enforcement vehicle). In another example, the external source can be the individual who is not in another vehicle, rather, situated at a proximity to the AV. In another example, the external source can be a road signage (e.g., a signpost, an electric signage, etc.). The processing device can analyze the signal to determine whether the AV is to be stopped in response to the detected signal. For example, based on the analysis, the processing device can determine that the signal is received from an individual who is a personnel authorized to stop the vehicle for a roadside inspection. In some implementations, the processing device can analyze the road signage, which can indicate that an AV is to be stopped at a third location (e.g., an intermediate location, a weigh station, a truck stop, a service area, etc.). The processing device can determine whether the AV is to be stopped based on analyzing the road signage.

In an implementation, if it is determined that the AV is to be stopped, the processing device can cause an AV control system ("AVCS") to stop the AV at the third location. In some implementations, if it is determined that the AV is to be stopped, the processing device can determine whether a characteristic of the AV satisfies a condition to stop the AV at the third location. For example, a characteristic, such as the size of the AV, can satisfy a condition to stop the AV at the third location when the size of the AV can be accommodated adequately in the free space available at the third location to stop the AV. If it is determined that the condition is satisfied, the processing device can cause the AVCS to stop the AV at the third location. In some implementations, responsive to determining that the AV is to be stopped, the processing device can identify the third location to stop the AV based on the indication from the source external to the AV. For example, the external source can indicate to stop the AV at the nearest free space available on the side of the road on which the AV is traveling. In another example, the external source can indicate to drive the AV off of a highway on which the AV is traveling to a side road and stop at an available space therein. In yet another example, the external source can indicate to drive the AV to the nearest weigh station and stop therein. In any instance, after identifying the third location to stop the AV, the processing device can cause the AVCS to stop the AV at the third location. Once the AV is stopped at the third location, the authorized personnel can proceed with initiating a roadside inspection with regards to the AV.

In some implementations, the processing device can determine whether one or more parking brakes are to be engaged. For example, if the authorized personnel does not initiate a roadside inspection, then the parking brakes need not be engaged. In another example, if the authorized personnel initiates a roadside inspection, it is necessary that the AV does not move while the AV is being inspected by the authorized personnel. Accordingly, the processing device can cause the AVCS to automatically engage the one or more parking brakes. This can ensure that the AV does not move while inspection is ongoing, without having to shut down functionalities of the AV entirely. After securing that the AV does not move, the roadside inspection can begin.

In some examples, the AV may not pass the roadside inspection. In an example, the AV can be declared "out-of-service," for example, for not passing the roadside inspection. At that point, the trip to the second location (destination location) can be terminated (e.g., ended). Accordingly, in some implementations, the processing device determines whether the trip is to be terminated. For example, the authorized personnel can provide an indication that the trip is to be terminated, and the processing device can recognize the indication. The AV can be kept at the location where it was stopped, or taken to a different location that authorized personnel indicates. Thus, if it is determined that the trip is to be terminated, the processing device determines whether the trip is to be terminated at the third location (e.g., the intermediate location where the AV was stopped). In one example, if it is determined that the trip is to be ended at the third location, the processing device causes the vehicle control system to end the trip at the third location. In some implementations, if it is determined that the AV should pull over or terminate the trip, the processing device can cause the AVCS to automatically turn on hazard lights to indicate to the authorized personnel that the vehicle is complying with instructions or indications received from the authorized personnel.

In another example, if it is determined that the trip is not to be terminated at the third location, the processing device identifies a fourth location for ending the trip. For example, the fourth location can include a location indicated by the authorized personnel, a weigh station, a location designated by law enforcement, etc. If the AV is to be moved to a different location than where it was stopped, the parking brakes need to be disengaged to move the AV. Accordingly, the processing device can determine whether the one or more parking brakes are to be disengaged. If the parking brakes are to be disengaged, the processing device can cause the AVCS to automatically disengage the parking brakes so that the AV can be moved to the identified fourth location, and end the trip at the fourth location.

In some examples, the AV can pass the roadside inspection, and can continue driving on the trip to the second location (e.g., the destination location). Accordingly, if it is determined that the trip is not to be terminated, the processing device can determine that the parking brakes are to be disengaged, so that the AV can be moved again. The processing device can cause the AVCS to automatically disengage the one or more parking brakes, and continue executing the trip to the second location (e.g., the destination location).

Therefore, advantages of the systems and methods implemented in accordance with some aspects of the disclosure include, but are not limited to improving the performance of an autonomous vehicle by implementing external indication handling, as described in more detail herein.

FIG. 1 is a diagram illustrating components of an example architecture 100 of a system that provides external indication handling for an autonomous vehicle (AV) 101, in accordance with some implementations of the disclosure. In an implementation, architecture 100 can include AV 101, AV server 150, data repository 180, and network 170.

In some implementations AV 101 is a long haul AV truck (e.g., commercial class 8 truck). Although alternatively referred to as "self-driving trucks (SDT)" or simply "trucks," autonomous vehicles can include any motor vehicles, such as cars, tractors (with or without trailers), buses, motorcycles, all-terrain vehicles, recreational vehicles, any specialized farming or construction vehicles, and the like), or any other self-propelled vehicles capable of being operated in a self-driving mode (without a human input or with a reduced human input). Autonomous vehicles can include vehicles with various levels of autonomy, such as level 2 (partial autonomy) through level 5 (full autonomy). Autonomous vehicles can include vehicles using an internal combustion engine (e.g., gas engine, diesel engine, etc.), an electric engine (motor), or combination thereof (e.g., hybrid AV). AV 101 can be capable of traveling on paved and/or unpaved roadways, off-road, on various surfaces encountered on farming (or other agricultural) land, within a driving environment (including indoor environment) of an industrial plant, and so on.

AV 101 can include a sensing system 120. The sensing system 120 can include various electromagnetic (e.g., optical) and non-electromagnetic (e.g., acoustic) sensing subsystems and/or devices that can be used in object sensing to facilitate autonomous driving, e.g., distance sensing, velocity sensing, acceleration sensing, rotational motion sensing, and so on. For example, optical sensing can utilize a range of light visible to a human eye (e.g., the 380 to 400 nanometer (nm) wavelength range), the UV range (below 380 nm), the infrared range (above 400 nm), the radio frequency range (above 1 m), etc. In implementations, "optical" can include any other suitable range of the electromagnetic spectrum.

The sensing system 120 can include one or more LiDAR sensors 122 (e.g., a LiDAR rangefinders), which can be laser-based units capable of determining distances (e.g., using time-of-flight (ToF) technology) to the objects in the environment around AV 101. For example, LiDAR sensor(s) 122 can emit one or more laser signals (pulses) that travel to an object and then detect arrived signals reflected from the object. By determining a time delay between the signal emission and the arrival of the retro-reflected waves, a ToF LiDAR sensor 122 can determine the distance to the object. LiDAR sensor(s) 122 can emit signals in various directions to obtain a wide view of the outside environment. LiDAR sensor(s) 122 can utilize wavelengths of electromagnetic waves that are shorter than the wavelength of the radio waves and can, therefore, provide a higher spatial resolution and sensitivity compared with the radar unit 124. In some implementations, LiDAR sensor(s) 122 can be (or include) coherent LiDAR sensor(s), such as a frequency-modulated continuous-wave (FMCW) LiDAR sensor(s). FMCW LiDAR sensor(s) (or some other coherent LiDAR sensor) can use optical heterodyne detection for instant velocity determination. LiDAR sensor(s) 122 can include one or more laser sources producing and emitting signals and one or more detectors of the signals reflected back from the objects, one or more spectral filters to filter out spurious electromagnetic waves having wavelengths (frequencies) that are different from the wavelengths (frequencies) of the emitted signals, one or more directional filters (e.g., apertures, diffraction gratings, and so on) to filter out electromagnetic waves that arrive at the detectors along directions different from the directions of the emitted signals, and other components that can enhance sensing capabilities of the LiDAR sensor(s) 122. In some implementations, LiDAR sensor(s) 122 can ensure a 360-degree view in a horizontal direction and up to 90 degrees in the vertical direction.

The sensing system 120 can include one or more radar units 124, which can be any system that utilizes radio or microwave frequency signals to sense objects within the driving environment of the AV 101. The radar unit(s) 124 can be configured to sense both the spatial locations of the objects (including their spatial dimensions) and their velocities (e.g., using the Doppler shift technology), such as translational velocities and angular (rotational) velocities. Sensing system 120 can also include one or more sonars 126, which can be ultrasonic sonars, in some implementations.

Sensing system 120 can further include one or more cameras 128 to capture images of the driving environment. The images can be two-dimensional projections of the driving environment (or parts of the driving environment) onto a projecting plane (flat or non-flat, e.g. fisheye) of the cameras. Some cameras 128 of sensing system 120 can be video cameras configured to capture a continuous (or quasi-continuous) stream of images of the driving environment.

The sensing data obtained by sensing system 120 can be processed by a perception system 130 that can be configured to detect and track objects in the driving environment and to identify the detected objects. For example, perception system 130 can analyze images captured by cameras 128 and can be capable of detecting traffic light signals, road signs, roadway layouts (e.g., boundaries of traffic lanes, topologies of intersections, designations of parking places, and so on), presence of obstacles, and the like. Perception system 130 can further receive the LiDAR sensing data (coherent Doppler data and incoherent ToF data) to determine distances to various objects in the environment and velocities of such objects. In some implementations, perception system 130 can use the LiDAR data in combination with the data captured by the camera(s) 128. In one example, the camera(s) 128 can detect an image of a rock partially obstructing a traffic lane. Using the data from the camera(s) 128, the perception system 130 can be capable of determining the angular size of the rock, but not the linear size of the rock. Using the LiDAR data, perception system 130 can determine the distance from the rock to the AV and, therefore, by combining the distance information with the angular size of the rock, perception system 130 can determine the linear dimensions of the rock as well.

In another implementation, using the LiDAR data, perception system 130 can determine how far a detected object is from the AV and can further determine the component of the object's velocity along the direction of the AV's motion. Furthermore, using a series of quick images obtained by the camera, perception system 130 can also determine the lateral velocity of the detected object in a direction perpendicular to the direction of the AV's motion. In some implementations, the lateral velocity can be determined from the LiDAR data alone, for example, by recognizing an edge of the object (using horizontal scanning) and further determining how quickly the edge of the object is moving in the lateral direction.

Perception system 130 can further receive information from a GPS transceiver (not shown) configured to obtain information about the position of the AV relative to Earth and use the GPS data in conjunction with the sensing data to help accurately determine location of the AV with respect to fixed objects of the driving environment, such as roadways, lane boundaries, intersections, sidewalks, crosswalks, road signs, surrounding buildings, and so on, locations of which can be provided by map information accessible by perception system 130. In some implementations, perception system 130 can receive non-electromagnetic data, such as sonar data (e.g., ultrasonic sensor data), temperature sensor data, pressure sensor data, meteorological data (e.g., wind speed and direction, precipitation data), or other environmental monitoring data.

In some implementations, the perception system 130 can provide, generate, or be used to help generate sensor data 194 (e.g., environmental sensing data, scenario sensing data, GPS data, etc.) pertaining to a route of a vehicle. Herein "route" refers to a sequence of physical locations (e.g., geographic markers) that can be traveled by a target vehicle between a starting point ("start") and a destination point ("destination"). The start and/or the destination need not be the initial and final locations of the vehicle in the driving mission, but can be any two points (e.g., A and B) along such a mission. Accordingly, "mission" herein refers to any portion of the overall driving task. A particular "trip" herein refers to a particular mission with a particular start and destination.

In some implementations, architecture 100 can also include a data repository 180. In some implementations, the data repository 180 is memory (e.g., random access memory), a drive (e.g., a hard drive, a flash drive), a database system, or another type of component or device capable of storing data. In some implementations, data repository 180 includes multiple storage components (e.g., multiple drives or multiple databases) that span multiple computing devices (e.g., multiple server computers). In some implementations, the data repository 180 stores one or more of route data 182, topographic data 184, map data 186, vehicle data 188, historical data 192, sensor data 194, reference data 196, and the like. In some implementations, at least a portion of the data shown in FIG. 1 as being stored in data repository 180 is stored in AV server 150 and/or AV 101.

Route data 182 can include information about the starting point, intermediate points and destination point of the route (e.g., longitude and latitude information of points along the route) and include physical characteristics of various routes. "Trajectory" refers to driving settings, specified for various locations along the route, and includes speed, throttle, brake, etc. control that determine progression of the vehicle along the route. For example, a trajectory can include throttle settings, T(L) as a function of the location L along the route, target speed of the vehicle S(L), gear selection sequences, and so on. The location L can be identified by the distance travelled, GPS coordinates, road markers (e.g., mileposts), or a combination thereof, or in any other way.

Topographic data 184 can include information about the topography of the roads (e.g., grade and radius of curvature, pitch, elevation, etc.) or topography along the route.

Map data 186 can include information about the road network along the route, such as the quality of road surfaces, number of lanes, regulatory speed limits (e.g., regulatory maximum speed limits, regulatory minimum speed limits), type and number of exit ramps, availability of gas stations, and so on. Map data 186 can also include traffic data that includes information about historic traffic patterns or current traffic conditions along or near the route.

Vehicle data 188 can include data about the AV 101. Vehicle data 188 can be physical vehicle data, such as total mass of the AV 101, braking capabilities of the AV (e.g., regenerative braking, friction braking, engine braking, downshifting, exhaust braking, using driveline retarders, etc.), transmission gear ratios of the AV, wheelbase data of the AV, engine capabilities of the AV, lateral dynamics data (e.g., how the AV reacts to winding roads), etc.

Historical data 192 can include data, such as recommended lane data (e.g., to merge, historically it is better to be in a certain lane), historical wind data (e.g., particular road segments historically have a particular speed and direction of wind), traffic data (e.g., historically a certain amount of traffic at particular road segments at particular times or days, historically vehicles are at a particular speed on particular road segments at particular times or days, etc.). In some implementations, the historical data 192 is collected from AVs 101 over time (e.g., via sensing system 120, via perception system 130, sent to AV server 150, etc.). The historical data 192 can be used as predictive data about future scenarios. For example, sensor data 194 can indicate that another vehicle is in an adjacent lane and has an engaged turn signal, the historical data 192 can include information indicating that historically, the vehicle will enter the same lane that AV 101 currently occupies in 3 seconds and will be approximately 3 meters in front of the AV 101 at that time.

In some implementations, the wind data is sensor data (e.g., from flow rate sensors, pressure sensors) from one or more AVs 101. In some implementations, the wind data is from a weather report. In some implementations, the wind data is calculated based on speed values, steering input values, and throttle input values one or more AVs 101 over time compared to steady state values of AVs 101.

Sensor data 194 (e.g., environmental sensing data) can include data obtained by sensing system 120 and/or include data from the perception system 130 that has been generated using the data from the sensing system 120. For example, sensor data 194 (e.g., environmental sensing data) can include information describing the environment of or proximate the AV 101 (e.g., position of other vehicles, obstacles, or other elements with respect to the AV 101).

The data generated by perception system 130 as well as various additional data (e.g., GPS data, route data 182, topographic data 184, map data 186, vehicle data 188, historical data 192, sensor data 194, reference data 196, and the like) can be used by an autonomous driving system, such as AV 101 control system (AVCS 140). The AVCS 140 can include one or more algorithms that control how AV 101 is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as vehicle systems 160 (e.g., the powertrain, steering and braking 162, vehicle electronics 164, and signaling 166), and other systems and components not explicitly shown in FIG. 1. The powertrain, steering and braking 162 can include an engine (internal combustion engine, electric engine (motor), and so on), transmission (e.g., transmission gears), differentials, axles, wheels, steering mechanism, braking mechanism, and other systems. The braking mechanism of the powertrain, steering and braking 162 can include one or more parking brakes. The vehicle electronics 164 can include an on-board computer, engine management, ignition, communication systems, carputers, telematics, in-car entertainment systems, and other systems and components. The signaling 166 can include high and low headlights, stopping lights, hazard lights, turning and backing lights, horns and alarms, inside lighting system, dashboard notification system, passenger notification system, radio and wireless network transmission systems, and so on. Some of the instructions output by the AVCS 140 can be delivered directly to the powertrain, steering and braking 162 (or signaling 166), whereas other instructions output by the AVCS 140 are first delivered to the electronics 164, which can generate commands to the powertrain, steering and braking 162 and/or signaling 166.

In one example, the AVCS 140 can determine that an obstacle identified by perception system 130 is to be avoided by decelerating the vehicle until a safe speed is reached, followed by steering the vehicle around the obstacle. The AVCS 140 can output instructions to the powertrain, steering and braking 162 (directly or via the electronics 164) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain, steering and braking 162 (directly or via the electronics 164) to resume the previous speed settings of the vehicle.

In some implementations, architecture 100 can also include AV server 150 to communicate relevant information to and receive relevant information from AV 101. For example, relevant information can include traffic information, weather information, route information, among other information. In some implementations, AV server 150 can be, at least at times, communicating with AV 101 via network 170. In some implementations, AV 101 can be connected to network 170 at most or all times. In some implementations, AV 101 can establish connections to network 170 intermittently, when an appropriate network signal is available. In some implementations, AV 101 can be connected to network 170 prior to starting the driving mission. Network 170 can use a wireless connection, such as a broadband cellular connection (e.g., 3G, 4G, 4G LTE, 5G, connection(s), and so on), a wireless local area network (WLAN), a wireless wide area network (WWAN), a wired connection, a satellite connection, or the like. Connection to network 170 can be facilitated via a network interface 106 (on the side of AV 101) and a network interface 152 (on the side of AV server 150). Network interfaces 106 and 152 can include antennas, network controllers, radio circuits, amplifiers, analog-to-digital and digital-to-analog converters, physical layers (PHY), media access control layers (MAC), and the like.

In some implementations, the AVCS 140 includes one or more routing module 144, and/or motion control module 146. In some implementations, the routing module 144 identifies data, such as route data 182, map data 186, and sensor data 194, and generates, based on the data, instructions (e.g., short time horizon routing data). For example, routing module 144 receives route data 182 indicating that the AV 101 is to travel along a particular road, map data 186 indicating regulatory speed limits of the particular road, and sensor data 194 indicating locations of vehicles and/or objects proximate the AV 101. The routing module 144 generates, based on the route data 182, map data 186, and sensor data 194, instructions (e.g., commands, short time horizon routing data) of vehicle actions of the AV 101 for the next interval (e.g., 10 seconds). The routing module 144 transmits the instructions to the motion control module 146 and the motion control module 146 controls one or more of the actuators (e.g., the vehicle systems 160) of the AV 101 based on the instructions for the next interval (e.g., 10 seconds). The routing module 144 continues generating instructions for the next interval (e.g., based on current route data 182, map data 186, and sensor data 194), transmitting the instructions to the motion control module 146, and the motion control module controls the actuators based on the instructions.

In some implementations, architecture 100 includes an external indication processing module 142. In some implementations, the external indication processing module 142 is hosted by the AV server 150. In some implementations, the external indication processing module 142 is hosted by the AV 101 (e.g., in AVCS 140).

In some implementations, the external indication processing module 142 can interface with routing module 144 and motion control module 146. The operations of external indication processing module 142 are further described below in conjunction with examples illustrated in FIG. 2.

Figure 2:
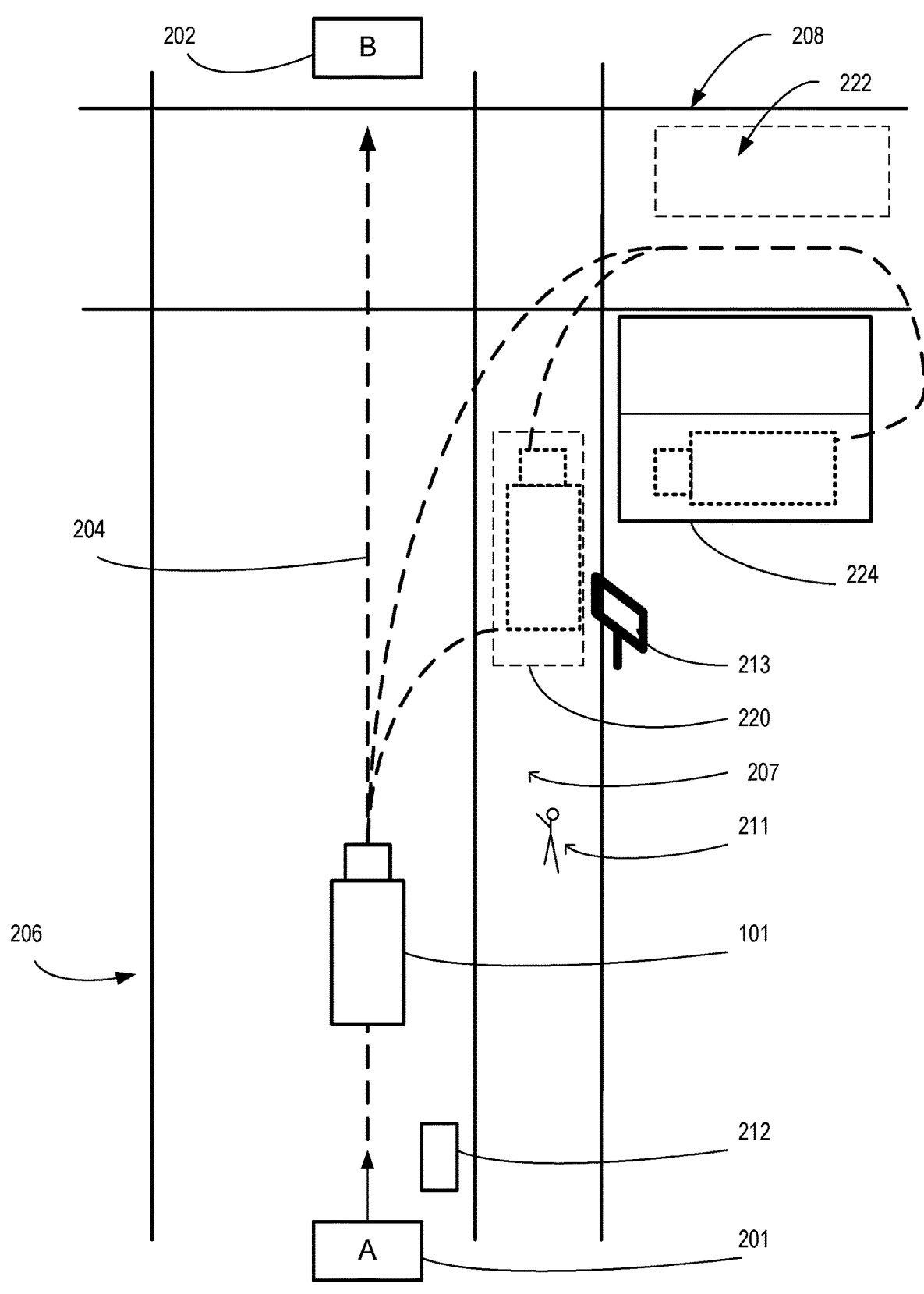
FIG. 2 is a diagram illustrating an example of handling external indications by an autonomous vehicle, in accordance with some implementations of the disclosure.

FIG. 2 shows examples of handling external indications by an AV 101, in accordance with some implementations of the disclosure. The external indication processing module 142 retrieves data from data repository 180 or from appropriate AV components or AV server 150. In an implementation, as shown in FIG. 2, AV 101 executes a particular trip AB from a starting location A (location 201) to a destination B (location 202) along a route 204 on road 206. In an example, road 206 can include a highway. In an example, AV 101 can include an SDT. While driving on route 204, sensing system 120 can detect a signal (e.g., an indication) from a source external to the AV. The detected signal can be stored in sensor data 194. The signal can indicate to stop the AV. In an example, the external source can be an individual (e.g., a law enforcement officer). In one example, the external source can be individual 211, who is situated at a proximity to the AV 101, such as on the side (e.g., shoulder 207) of the road 206. In another example, individual 211 can be situated inside another vehicle (e.g., a law enforcement vehicle), which can be moving or stationary. For example, individual 211 can be inside a moving vehicle 212. In another example, the external source can be a road signage 213 (e.g., a signpost, an electric signage, etc.).

The module 142 can monitor and analyze sensor data 194 to determine whether the AV is to be stopped in response to a signal detected in sensor data 194. For example, sensor data 194 can include a gesture received from individual 211. In an example, the gesture can include hand gestures, such as hand gestures that direct the AV 101 to pull over to the shoulder 207. Hand gestures can also include a gesture directing the AV 101 to follow road signage 213, to take a particular exit, or to stop at a designated location. In some examples, sensor data 194 can include data received from and/or regarding vehicle 212. For example, individual 211 can be inside vehicle 212. Vehicle 212 can provide a signal to stop the AV 101 using flashing lights, and/or sirens. Individual 211 can provide an instruction using an audio signal, for example, via a loudspeaker. Module 142 can analyze such signals to determine if the AV 101 is to be stopped. In some examples, individual 211 can initiate a communication with the AV 101 or AV server 150, or another entity with an ability to control the AV 101, to send signals to stop the AV. For example, the communication can include a telecommunication signal, such as individual 211 calling a particular phone number to communicate the instruction to stop the AV 101.

Module 142 can determine that individual 211 is a personnel that is authorized to stop the AV 101 for a roadside inspection. For example, module 142 can recognize that individual 211 is a law enforcement officer, and/or possesses the necessary credentials to stop the AV 101. In an example, module 142 can use sensor data 194 to analyze visual characteristics of an object recognized as individual 211, including the color, material (e.g., reflective material), and/or type of clothing (e.g., uniforms) and/or badges worn by individual 211, or text written on the clothing, etc. If individual 211 is located in or next to vehicle 212, module 142 can use sensor data 194 to analyze visual characteristics of vehicle 212, including the color, size, emblem or text written on the vehicle, etc. In some examples, the AV 101 can be stopped by a highway patrol. Highway patrol can have a different appearance and use different types of vehicles than local police officers. In some examples, road inspections can only be conducted by personnel having particular credentials, such as a particular certification, accreditation, etc. The personnel can wear a particular type of badge or have a particular type of the vehicle that indicates the special credentials. The module 142 can use reference data 196, which can include the criteria for an individual to be authorized as a personnel that can stop the AV 101, or a vehicle that can be used to provide a signal to stop the AV 101. In one example, if it is determined that detected signal and information from sensor data 194 satisfies the criteria, then individual 211 can be identified as an authorized personnel that can stop the AV 101. In another example, if it is determined that detected signal from vehicle 212 and information from sensor data 194 regarding vehicle 212 satisfies the criteria in reference data 196, then individual 211 can be identified as an authorized personnel that can stop the AV 101. In yet another example, based on verifying information from the communication initiated by individual 211, module 142 can determine that the AV is to be stopped. In still another example, if the module 142 is unable to confirm that an individual (or vehicle 212) instructing the AV 101 to stop corresponds to an authorized personnel, the module 142 can communicate with the AV server 150 and transmit information pertaining to the characteristics of the individual or the vehicle 212 (e.g., an image of the badge, an image of the vehicle 212) to the AV server 150. The AV server 150 may then search data repository 180 or another data repository storing data identifying various characteristics associated with authorized personnel to verify whether the individual or the vehicle 212 corresponds to an authorized personnel, and return a confirmation to the module 142. Alternatively, the AV server 150 may send a notification to an AV support team or person to review the information received from the module 142 and provide a respective response, which can then be returned to the module 142.

In some implementations, the processing device can analyze the road signage 213. In an example, road signage 213 can indicate that an AV is to be stopped at a third location, such as, an intermediate location, a weigh station, etc. For example, the road signage 213 can indicate that a truck having a certain criterion must enter a particular weigh station. The road signage 213 can include direction to the weigh station. Module 142 can determine whether the AV is to be stopped based on analyzing the road signage 213. For example, module 142 can compare the detected road signage to reference data 196, which can include data indicating types and characteristics of road signage that indicates that the AV 101 should be stopped. If the road signage 213 satisfies the criteria to stop the AV, module 142 determines that the AV 101 should be stopped.

In an implementation, if it is determined that the AV 101 is to be stopped, the module 142 can cause AVCS 140 to stop the AV 101 at a third location. In an example, a module of the AVCS 140, such as motion control module 146, can cause the AV 101 to be stopped. The third location can be an intermediate location. The module 142 can identify the third location where the AV 101 can be stopped.

In some implementations, to identify the third location, the module 142 can determine whether a characteristic of the AV 101 satisfies a condition to stop the AV 101 at the third location. For example, a characteristic, such as the size, of the AV 101 can satisfy a condition to stop the AV 101 at the third location when the size of the AV 101 can be accommodated adequately in a free space available at a third location to stop the AV 101. For example, the free space 220 of an intermediate location (e.g., third location) on shoulder 207 can adequately accommodate AV 101. In another example, the condition is satisfied when the environment surrounding AV 101 can support maneuvering the AV 101 to the free space 220. If it is determined that the condition to stop the AV 101 at the third location is satisfied, the module 142 can cause the AVCS 140 (or, module 146) to stop the AV 101 at the third location.

In some implementations, the module 142 can identify the third location to stop the AV 101 based on the indication from the source external to the AV (e.g., individual 211, vehicle 212, signage 213, etc.). For example, the external source can indicate to stop the AV 101 at the nearest free space (e.g., free space 220) available on the side (e.g., shoulder 207) of the road 206 on which the AV 101 is traveling. In another example, the external source can indicate to drive the AV 101 off of a highway (e.g., road 206) on which the AV 101 is traveling to a side road 208 and stop at an available space 22 on or nearby the side road 208. In yet another example, the external source can provide the third location by indicating to drive the AV 101 to the nearest weigh station 224 and stop therein. In any instance, after identifying the third location to stop the AV, the module 142 can cause the AVCS 140 to stop the AV 101 at the third location. Once the AV 101 is stopped at the third location, an authorized personnel can proceed with initiating a roadside inspection with regards to the AV 101 to comply with applicable regulations.

While the AV 101 is being inspected by the authorized personnel, it is important for the safety of the authorized personnel and the AV 101, as well as for ensuring compliance with regulation, that the AV 101 does not move. It is not preferable to shut down all functionalities of the AV 101 to ensure the AV 101 does not move, as various functionalities of the AV 101 is being inspected as well as communication channels with the AV 101 is to be kept open. Thus, in some implementations, parking brakes can be used to ensure that the AV 101 is not able to move. In an implementation, the module 142 can determine whether one or more parking brakes are to be engaged. In an example, parking brakes can be engaged based on an authorized personnel's indication that an inspection is to begin, and can be disengaged based on an indication that the inspection has concluded and/or the AV 101 can move to another location. For example, if the authorized personnel does not initiate a roadside inspection after stopping the AV 101 at the third location, then the parking brakes need not be engaged. In another example, if the authorized personnel initiates a roadside inspection, it is necessary that the AV 101 does not move while the AV 101 is being inspected by the authorized personnel. Accordingly, the module 142 can cause the AVCS 140 (or, particularly, motion control module 146) to automatically engage the one or more parking brakes included in the vehicle systems 160. In an example, the parking brakes can be engaged electronically. In an implementation, module 142 can also contact a support team for the AV 101 that can initiate a hold on the movement of the AV 101, for example, via AV server 150, or using network 170. Engaging the parking brakes and/or initiating a hold can ensure that the AV 101 does not move while inspection is ongoing, without the need to shut down all functionalities of the AV 101. After securing that the AV 101 does not move, the roadside inspection can begin. In some examples, the support team for AV 101 can communicate with the authorized personnel conducting the inspection with regard to information necessary for the inspection. In some examples, the communication can be initiated by rolling down windows of AV 101 and communicating with the authorized personnel through built-in communications systems in the AV 101. In some implementations, pre-trip inspection information can be transmitted to the AV 101, or provided to the authorized personnel to assist with the roadside inspection.

In some examples, the AV 101 may not pass the roadside inspection. In an example, the AV 101 can be declared "out-of-service," for example, for not passing the roadside inspection, which can mean the AV 101 can no longer be authorized to operate on the roads as usual. At that point, the trip AB to the destination B, or location 202, is to be terminated (e.g., ended). Accordingly, in some implementations, the module 142 determines whether the trip AB is to be terminated. For example, the authorized personnel and/or a device (e.g., mechanical, electronic) can provide an indication (e.g., verbal order, written notice, a gesture, lights, signs, etc.) that the trip AB is to be terminated, and the module 142 can recognize the indication. The AV 101 can be kept at the location where it was stopped, or taken to a different location that authorized personnel indicates. Thus, if it is determined that the trip is to be terminated, module 142 determines whether the trip AB is to be terminated at the third location (e.g., the intermediate location where the AV 101 was stopped). In one example, if it is determined that the trip AB is to be ended at the third location where the AV 101 is currently stopped, the module 142 causes the AVCS 140 to end the trip at the third location. For example, the AV 101 can be stopped at weigh station 224, and module 142 can cause the AVCS 140 to end the trip AB at the weigh station 224, such that AV 101 is not moved from the weigh station 224 until further notice. In some implementations, if it is determined that AV 101 should pull over or terminate the trip, module 142 can cause the AVCS 140 to automatically turn on hazard lights to indicate to the authorized personnel that the vehicle is complying with instructions or indications received from the authorized personnel.

In another example, if it is determined that the trip AB is not to be terminated at the third location, the module 142 identifies a fourth location for ending the trip AB. For example, the fourth location can include a location indicated by the authorized personnel, a weigh station, a location designated by law enforcement, etc. In an example, the AV 101 can be currently stopped at shoulder 207, and individual 211 can identify weigh station 224 for ending the trip AB. If the AV 101 is to be moved to a different location than where it was stopped, the parking brakes need to be disengaged to move the AV 101. Accordingly, the module 142 can determine whether the one or more parking brakes are to be disengaged. For example, the authorized personnel can provide an indication to disengage the parking brakes using hand gestures (e.g., indicating that the inspection is over, that AV 101 can move, etc.), verbal command, written notice, and/or an electronic indication (e.g., sign, lights, etc.) can be provided to the AV 101 to disengage the parking brakes. In some examples, the support team for AV 101 can also provide an indication that it is appropriate to disengage the parking brakes. If the parking brakes are to be disengaged, the module 142 can cause the AVCS 140 to automatically disengage the parking brakes so that the AV 101 can be moved to the identified fourth location (e.g., weigh station 224), and end the trip at the fourth location.

In some examples, the AV 101 can pass the roadside inspection, and can continue on the trip AB by driving to the second location (e.g., the destination location B). Accordingly, if it is determined that the trip AB is not to be terminated, the module 142 can determine that the parking brakes are to be disengaged, so that the AV 101 can be moved again. The module 142 can cause the AVCS 140 to automatically disengage the one or more parking brakes, and continue executing the trip AB to the second location (e.g., the destination location B) to complete the trip AB.

In some implementations, various recognitions described in this disclosure can be performed using machine learning algorithms. Examples of using machine learning algorithms can include, but not be limited to, recognizing that individual 211 is an authorized personnel, recognizing that vehicle 212 is an authorized vehicle, recognizing that road signage 213 indicates to stop the AV 101, recognizing that the AV 101 should be moved to a different location to allow for the inspection to be performed, identifying a location where the AV 101 should be moved to allow for the inspection to be performed or where the trip of the AV 101 should end, etc.

FIG. 3A depicts a flow diagram of an example method 300 of performing external indication handling with respect to the autonomous vehicles to engage one or more parking brakes automatically, in accordance with some implementations of the disclosure. Method 300 and/or each of the individual functions, routines, subroutines, or operations of method 300 can be performed by a processing device, having one or more processing units (CPU) and memory devices communicatively coupled to the CPU(s). The processing device executing methods 300 can be part of a server (located outside an autonomous vehicle, such as AV server 150) or a client processing module (located within or at the autonomous vehicle, such as AVCS 140), or any combination thereof. In some implementations, method 300 can be performed by a single processing thread or alternatively by two or more processing threads, each thread executing one or more individual functions, routines, subroutines, or operations of the method. The method 300 as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 300 is performed by external indication processing module 142 described in FIG. 1. Although shown in a particular sequence or order, unless otherwise specified, the order of the operations can be modified. Thus, the illustrated implementations should be understood only as examples, and the illustrated operations can be performed in a different order, while some operations can be performed in parallel. Additionally, one or more operations can be omitted in some implementations. Thus, not all illustrated operations are required in every implementation, and other process flows are possible. In some implementations, the same, different, fewer, or greater operations can be performed.

At operation 302, processing logic detects, by a sensing system of an AV executing a trip from a first location to a second location, a signal from a source external to the AV to stop the AV. At operation 304, processing logic analyzes the signal to determine whether the AV is to be stopped in response to the signal. In some implementations, the processing logic analyzes a road signage indicating that the AV is to be stopped at the third location, and determines whether the AV is to be stopped based on the road signage.

At operation 306, responsive to determining that the AV is to be stopped, the processing logic causes a vehicle control system of the AV to stop the AV at a third location. In some implementations, responsive to determining that the AV is to be stopped, the processing logic determines that a characteristic of the AV satisfies a condition to stop the AV at the third location, and causes the vehicle control system of the AV to stop the AV at the third location. In some implementations, responsive to determining that the AV is to be stopped, the processing logic identifies the third location to stop the AV (e.g., based on the indication from the source external to the AV, an output of a machine learning algorithm, etc.), and causes the vehicle control system of the AV to stop the AV at the third location.

At operation 308, processing logic determines that one or more parking brakes are to be engaged. At operation 310, processing logic causes the vehicle control system to automatically engage the one or more parking brakes.

Furthermore, in some implementations, the processing logic determines whether the trip is to be terminated. If it is determined that the trip is to be terminated, the processing logic determines whether the trip is to be terminated at the third location. If it is determined that the trip is to be terminated at the third location, the processing logic causes the vehicle control system to terminate the trip at the third location. In one example, if it is determined that the trip is not to be terminated at the third location, the processing logic identifies a fourth location for terminating the trip. In an example, the processing logic determines that the one or more parking brakes are to be disengaged, and causes the vehicle control system to automatically disengage the one or more parking brakes, move the AV to the fourth location, and terminate the trip at the fourth location. In another example, if it is determined that the trip is not to be terminated, the processing logic determines that the one or more parking brakes are to be disengaged. The processing logic causes the vehicle control system to automatically disengage the one or more parking brakes, and continues executing the trip to the second location.

FIG. 3B depicts a flow diagram of an example method 320 of performing external indication handling with respect to the autonomous vehicles to terminate a trip by the AV, in accordance with some implementations of the disclosure. Method 320 and/or each of the individual functions, routines, subroutines, or operations of method 320 can be performed by a processing device, having one or more processing units (CPU) and memory devices communicatively coupled to the CPU(s). The processing device executing methods 320 can be part of a server (located outside an autonomous vehicle, such as AV server 150) or a client processing module (located within or at the autonomous vehicle, such as AVCS 140), or any combination thereof. In some implementations, method 320 can be performed by a single processing thread or alternatively by two or more processing threads, each thread executing one or more individual functions, routines, subroutines, or operations of the method. The method 320 as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 320 is performed by external indication processing module 142 described in FIG. 1. Although shown in a particular sequence or order, unless otherwise specified, the order of the operations can be modified. Thus, the illustrated implementations should be understood only as examples, and the illustrated operations can be performed in a different order, while some operations can be performed in parallel. Additionally, one or more operations can be omitted in some implementations. Thus, not all illustrated operations are required in every implementation, and other process flows are possible. In some implementations, the same, different, fewer, or greater operations can be performed.

At operation 322, processing logic detects, by a sensing system of an AV executing a trip from a first location to a second location, a signal from a source external to the AV to stop the AV. In some implementations, the processing logic analyzes the indication to determine whether the AV is to be stopped. In some examples, the indication includes a road signage indicating that the AV is to be stopped.

At operation 324, processing logic causes a vehicle control system of the AV to stop the AV in response to the indication. In some implementations, the processing logic determines that a characteristic of the AV satisfies a condition to stop the AV at a fourth location, and causes the vehicle control system of the AV to stop the AV at the fourth location. Furthermore, in some implementations, responsive to causing the vehicle control system to stop the AV, the processing logic determines that one or more parking brakes are to be engaged, and causes the vehicle control system to automatically engage the one or more parking brakes.

Additionally, in some examples, the processing logic determines that the one or more parking brakes are to be disengaged. The processing logic causes the vehicle control system to automatically disengage the one or more parking brakes, and cause the vehicle control system to move the AV to the third location. In some examples, the third location is identified based on the indication from the source external to the AV, an output of a machine learning algorithm, etc.

At operation 326, processing logic determines whether the trip is to be terminated. At operation 328, responsive to determining that the trip is to be terminated, the processing logic identifies a third location for terminating the trip. At operation 330, processing logic causes the vehicle control system to terminate the trip at the third location.

Figure 4:
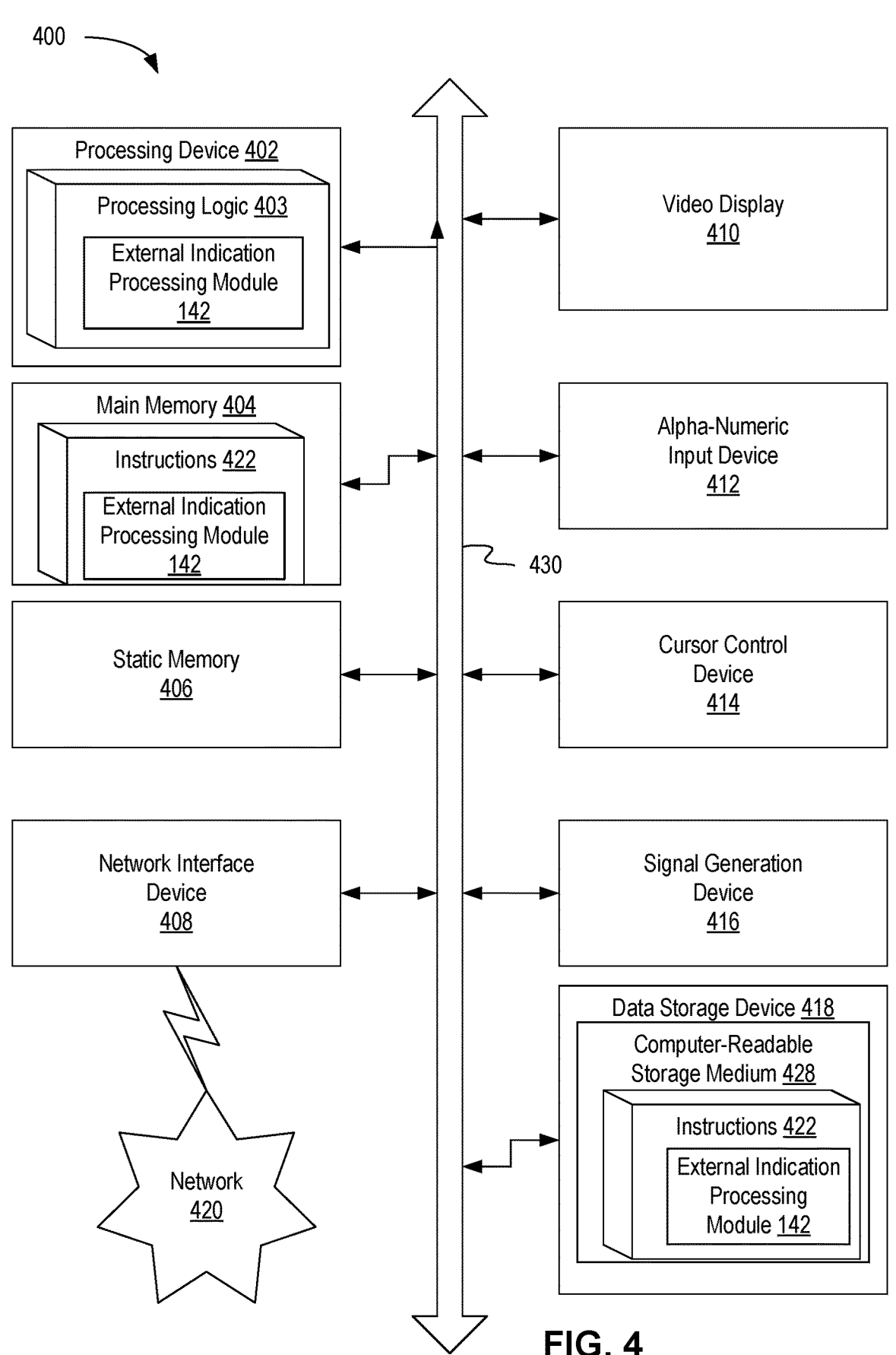
FIG. 4 depicts a block diagram of an example computer device within which a set of instructions, for causing the machine to perform any of the one or more methodologies discussed herein can be executed, in accordance with some implementations of the disclosure.

FIG. 4 depicts a block diagram of an example computer device 400 within which a set of instructions, for causing the machine to perform any of the one or more methodologies discussed herein can be executed, in accordance with some implementations of the disclosure. Example computer device 400 can be connected to other computer devices in a LAN, an intranet, an extranet, and/or the Internet. Computer device 400 can operate in the capacity of a server in a client-server network environment. Computer device 400 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" includes any collection of computers that individually or jointly execute a set (or multiple sets) of instructions to perform any one or more of the methods discussed herein. In some implementations, the computer device 400 is AV server 150. In some implementations, the AV 101 includes computer device 400 (e.g., AVCS 140 is computer device 400). In some implementations, computer device 400 executes the external indication processing module 142.

Example computer device 400 can include a processing device 402 (also referred to as a processor or CPU), which can include processing logic 403, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a secondary memory (e.g., a data storage device 418), which can communicate with each other via a bus 430.

Processing device 402 represents one or more general-purpose processing devices such as a microprocessor, central processing unit, or the like. More particularly, processing device 402 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 402 can be configured to execute instructions performing any of the operations performed by the external indication processing module 142.

Example computer device 400 can further comprise a network interface device 408, which can be communicatively coupled to a network 420. Example computer device 400 can further comprise a video display 410 (e.g., a liquid crystal display (LCD), a touch screen, or a cathode ray tube (CRT)), an alphanumeric input device 412 (e.g., a keyboard), a cursor control device 414 (e.g., a mouse), and an acoustic signal generation device 416 (e.g., a speaker).

Data storage device 418 can include a computer-readable storage medium (or, more specifically, a non-transitory computer-readable storage medium) 428 on which is stored one or more sets of executable instructions 422. In accordance with one or more aspects of the disclosure, executable instructions 422 can comprise executable instructions to perform any of the operations of external indication processing module 142.

Executable instructions 422 can also reside, completely or at least partially, within main memory 404 and/or within processing device 402 during execution thereof by example computer device 400, main memory 404 and processing device 402 also constituting computer-readable storage media. Executable instructions 422 can further be transmitted or received over a network via network interface device 408.

While the computer-readable storage medium 428 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" includes any medium that is capable of storing or encoding a set of instructions for execution by the machine that cause the machine to perform any one or more of the methods described herein. The term "computer-readable storage medium" includes, but is not limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment," "one embodiment," "some embodiments," "an implementation," "one implementation," "some implementations," or the like throughout may or may not mean the same embodiment or implementation. One or more embodiments or implementations described herein may be combined in a particular embodiment or implementation. The terms "first," "second," "third," "fourth," etc. as used herein are meant as labels to distinguish among different elements and may not necessarily have an ordinal meaning according to their numerical designation.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
detecting, using a sensing system of an autonomous vehicle (AV) executing a trip from a first location to a second location, a signal to stop the AV;
in response to the signal, determining, by at least one processing device of the AV, that the AV is to be stopped for a roadside inspection of the AV by an authorized inspection entity;
causing, by the at least one processing device of the AV, a vehicle control system of the AV to stop the AV at a third location determined to be suitable to perform the roadside inspection; and
causing, by the at least one processing device of the AV, the vehicle control system of the AV to perform an operation that initiates a communication session between one or more communications systems of the AV and a device of the authorized inspection entity conducting the roadside inspection, and to provide, via the communication session, information required for the roadside inspection from the one or more communications systems of the AV to the device of the authorized inspection entity conducting the roadside inspection.

2. The method of claim 1, wherein the signal is from a source external to the AV.

3. The method of claim 1, wherein the signal comprises a road signage indicating that the AV is to be stopped.

4. The method of claim 1, wherein causing the vehicle control system to stop the AV at the third location determined to be suitable to perform the roadside inspection comprises:
responsive to determining that the AV is to be stopped, determining, by the at least one processing device of the AV, that a characteristic of the AV satisfies a condition to stop the AV at the third location; and
causing the vehicle control system of the AV to stop the AV at the third location.

5. The method of claim 1, wherein causing the vehicle control system to stop the AV comprises:
responsive to determining that the AV is to be stopped, identifying, by the at least one processing device of the AV, the third location to stop the AV based on the signal; and
causing the vehicle control system of the AV to stop the AV at the third location.

6. The method of claim 1, wherein causing the vehicle control system to stop the AV comprises:
determining, by the at least one processing device of the AV, that one or more parking brakes are to be engaged to allow the roadside inspection to be performed; and causing, by the at least one processing device of the AV, the vehicle control system to automatically engage the one or more parking brakes.

7. The method of claim 6, further comprising:
determining whether the trip is to be terminated;
responsive to determining that the trip is not to be terminated, determining, by the at least one processing device of the AV, that the one or more parking brakes are to be disengaged; and
causing the vehicle control system to:
automatically disengage the one or more parking brakes; and
continue executing the trip to the second location.

8. The method of claim 6, further comprising:
determining, by the at least one processing device of the AV, whether the trip is to be terminated;
responsive to determining that the trip is to be terminated, determining whether the trip is to be terminated at the third location;
responsive to determining that the trip is not to be terminated at the third location, identifying, by the at least one processing device of the AV, a fourth location for terminating the trip;
determining, by the at least one processing device of the AV, that the one or more parking brakes are to be disengaged; and
causing the vehicle control system to:
automatically disengage the one or more parking brakes;
move the AV to the fourth location; and
terminate the trip at the fourth location.

9. The method of claim 1, further comprising:
determining, by the at least one processing device of the AV, whether the trip is to be terminated;
responsive to determining that the trip is to be terminated, determining whether the trip is to be terminated at the third location; and
responsive to determining that the trip is to be terminated at the third location, causing the vehicle control system to terminate the trip at the third location.

10. A system for an autonomous vehicle (AV), comprising:
a memory device; and
at least one processing device of the AV, coupled to the memory device, to perform operations comprising:
detecting, using a sensing system of the AV executing a trip from a first location to a second location, a signal to stop the AV;
determining, in response to the signal, that the AV is to be stopped for a roadside inspection of the AV by an authorized inspection entity;
causing a vehicle control system of the AV to stop the AV at a third location determined to be suitable to perform the roadside inspection; and
causing the vehicle control system of the AV to perform an operation that initiates a communication session between one or more communications systems of the AV and a device of the authorized inspection entity conducting the roadside inspection, and to provide, via the communication session, information required for the roadside inspection from the one or more communications systems of the AV to the device of the authorized inspection entity conducting the roadside inspection.

11. The system of claim 10, wherein the signal is from a source external to the AV.

12. The system of claim 10, wherein the signal comprises a road signage indicating that the AV is to be stopped.

13. The system of claim 10, wherein causing the vehicle control system to stop the AV at the third location determined to be suitable to perform the roadside inspection comprises:

responsive to determining that the AV is to be stopped, determining that a characteristic of the AV satisfies a condition to stop the AV at the third location; and causing the vehicle control system of the AV to stop the AV at the third location.

14. The system of claim 10, wherein causing the vehicle control system to stop the AV comprises:

determining that one or more parking brakes are to be engaged to allow the roadside inspection to be performed; and causing the vehicle control system to automatically engage the one or more parking brakes.

15. The system of claim 14, the operations further comprising:

determining whether the trip is to be terminated;

responsive to determining that the trip is not to be terminated, determining that the one or more parking brakes are to be disengaged; and causing the vehicle control system to:

automatically disengage the one or more parking brakes; and continue executing the trip to the second location.

16. The system of claim 14, the operations further comprising:

determining whether the trip is to be terminated;

responsive to determining that the trip is to be terminated, determining whether the trip is to be terminated at the third location;

responsive to determining that the trip is not to be terminated at the third location, identifying a fourth location for terminating the trip;

determining that the one or more parking brakes are to be disengaged; and causing the vehicle control system to:

automatically disengage the one or more parking brakes;

move the AV to the fourth location; and terminate the trip at the fourth location.

17. A non-transitory device-readable medium storing instructions that, when executed by at least one processing device of an autonomous vehicle (AV), cause the at least one processing device of the AV to perform operations comprising:

detecting, using a sensing system of the AV executing a trip from a first location to a second location, a signal to stop the AV;

determining, in response to the signal, that the AV is to be stopped for a roadside inspection of the AV by an authorized inspection entity;

causing a vehicle control system of the AV to stop the AV at a third location determined to be suitable to perform the roadside inspection; and causing the vehicle control system of the AV to perform an operation that initiates a communication session between one or more communications systems of the AV and a device of the authorized inspection entity conducting the roadside inspection, and to provide, via the communication session, information required for the roadside inspection from the one or more communications systems of the AV to the device of the authorized inspection entity conducting the roadside inspection.

18. The non-transitory device-readable medium of claim 17, wherein the signal is from a source external to the AV.

19. The non-transitory device-readable medium of claim 17, wherein the signal comprises a road signage indicating that the AV is to be stopped.

20. The non-transitory device-readable medium of claim 17, wherein causing the vehicle control system to stop the AV determined to be suitable to perform the roadside inspection comprises:

determining that one or more parking brakes are to be engaged to allow the roadside inspection to be performed; and causing the vehicle control system to automatically engage the one or more parking brakes.

\* \* \* \* \*